(12) United States Patent
Alexander et al.

(10) Patent No.: US 10,353,817 B2
(45) Date of Patent: Jul. 16, 2019

(54) CACHE MISS THREAD BALANCING

(71) Applicant: International Business Machines Corporation, Armonk, NY (US)

(72) Inventors: Gregory W. Alexander, Pflugerville, TX (US); Brian D. Barrick, Pflugerville, TX (US); Thomas W. Fox, Hopewell Junction, NY (US); Christian Jacobi, West Park, NY (US); Anthony Saporito, Highland, NY (US); Somin Song, Austin, TX (US); Aaron Tsai, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 15/451,858

(22) Filed: Mar. 7, 2017

(65) Prior Publication Data
US 2018/0260326 A1    Sep. 13, 2018

(51) Int. Cl.
*G06F 12/08* (2016.01)
*G06F 12/0811* (2016.01)
*G06F 12/0813* (2016.01)
*G06F 12/0804* (2016.01)
*G06F 12/0875* (2016.01)

(52) U.S. Cl.
CPC ...... *G06F 12/0811* (2013.01); *G06F 12/0804* (2013.01); *G06F 12/0813* (2013.01); *G06F 12/0875* (2013.01); *G06F 2212/452* (2013.01); *G06F 2212/60* (2013.01); *G06F 2212/62* (2013.01)

(58) Field of Classification Search
CPC ............. G06F 12/0811; G06F 12/0813; G06F 12/0804; G06F 12/0875
USPC .......................................................... 711/133
See application file for complete search history.

(56) References Cited

U.S. PATENT DOCUMENTS

| | | | | |
|---|---|---|---|---|
| 5,933,627 A | * | 8/1999 | Parady | G06F 9/3851 711/122 |
| 2004/0216105 A1 | | 10/2004 | Burky | |
| 2006/0179274 A1 | | 8/2006 | Jones | |
| 2009/0249349 A1 | * | 10/2009 | Bose | G06F 9/4893 718/103 |
| 2014/0095691 A1 | | 4/2014 | Ganguli | |

(Continued)

OTHER PUBLICATIONS

International Search Report and Written Opinion for Application No. PCT/IB2018/051213, Application Filing Date Feb. 27, 2018; dated Jun. 27, 2018. 10 Pages.

*Primary Examiner* — Than Nguyen
(74) *Attorney, Agent, or Firm* — Cantor Colburn LLP; William Kinnaman

(57) ABSTRACT

A simultaneous multithread (SMT) processor having a shared dispatch pipeline includes a first circuit that detects a cache miss thread. A second circuit determines a first cache hierarchy level at which the detected cache miss occurred. A third circuit determines a Next To Complete (NTC) group in the thread and a plurality of additional groups (X) in the thread. The additional groups (X) are dynamically configured based on the detected cache miss. A fourth circuit determines whether any groups in the thread are younger than the determined NTC group and the plurality of additional groups (X), and flushes all the determined younger groups from the cache miss thread.

23 Claims, 10 Drawing Sheets

(56) References Cited

U.S. PATENT DOCUMENTS

| | | |
|---|---|---|
| 2014/0181410 A1 | 6/2014 | Kalamatianos |
| 2015/0378915 A1 | 12/2015 | Gschwind |
| 2016/0117172 A1* | 4/2016 | Alexander ............ G06F 9/3853 712/215 |
| 2016/0117175 A1* | 4/2016 | Alexander ............ G06F 9/3853 712/215 |
| 2016/0357669 A1 | 12/2016 | Greenhalgh |

* cited by examiner

CACHE MISS THREAD BALANCING

BACKGROUND

The present invention relates generally to an improved data processing system, and more specifically, to flushing pending cache misses in a multithread data processing system.

Conventional data processing systems and microprocessor systems incorporate simultaneous multithreading techniques to improve utilization of computing resources and computer performance. These data processing systems can experience a cache miss at a cache hierarchy level (e.g., L1, L2, L3, L4 . . . LN). The cache misses can cause a thread corresponding to a given cache miss to saturate and over-consume the majority of the computing resources.

SUMMARY

According to a non-limiting embodiment, a method of balancing a cache miss thread includes detecting a cache miss of the cache miss thread, and determining a first cache hierarchy level at which the detected cache miss occurred. The method further includes determining a Next To Complete (NTC) group in the cache miss thread and a plurality of additional groups (X) in the cache miss thread. The plurality of additional groups (X) are dynamically configured based on the detected cache miss. The method further includes determining whether any groups in the cache miss thread are younger than the determined NTC group and the plurality of additional groups (X), and flushing all the determined younger groups from the cache miss thread.

According to another non-limiting embodiment, a computer program product performs cache miss thread balancing. The computer program product comprises a computer readable storage medium having program instructions embodied therewith. The program instructions are executable by an electronic computer processor to control a database processing system to detect a cache miss in the cache miss thread, and determine a cache hierarchy level at which the detected cache miss occurred. The electronic computer processor further controls the database processing system to determine a Next To Complete (NTC) group in the cache miss thread and a plurality additional groups (X) in the cache miss thread. The plurality of additional groups (X) are dynamically configured based on the detected cache miss. The electronic computer processor further controls the database processing system to determine whether any groups in the thread are younger than the determined NTC group and the plurality of additional groups (X), and flush all the determined younger groups from the cache miss thread.

According to yet another non-limiting embodiment, a simultaneous multithread (SMT) processor having a shared dispatch pipeline includes a first circuit that detects a cache miss thread. A second circuit determines a first cache hierarchy level at which the detected cache miss occurred. A third circuit determines a Next To Complete (NTC) group in the thread and a plurality of additional groups (X) in the thread. The additional groups (X) are dynamically configured based on the detected cache miss. A fourth circuit determines whether any groups in the thread are younger than the determined NTC group and the plurality of additional groups (X), and flushes all the determined younger groups from the cache miss thread.

According to still another non-limiting embodiment, a method of performing a cache miss thread balance on a global completion table comprises detecting a first group of a first thread experiencing a pending cache miss, and determining a Next To Complete (NTC) group in the first thread and plurality of additional groups (X) in the first thread. The method further includes flushing, from the global completion table, at least one group of the first thread that is dispatched after the NTC group in the first thread and plurality of additional groups (X) in the first thread so as to provide at least one empty global completion table entry field. The method further includes storing, in the at least one empty global completion table entry field, a new group of a second thread different from the first thread.

According to another non-limiting embodiment,

Additional features are realized through the techniques of the present invention. Other embodiments are described in detail herein and are considered a part of the claimed invention. For a better understanding of the invention with the features, refer to the description and to the drawings.

DETAILED DESCRIPTION

Cache miss thread balancing prevents a thread from exhausting shared resources upon cache miss pending state. This enhances balancing of threads in the core and hence improves the overall performance of the core with simultaneous multithreading. Currently, the entire thread is flushed except the oldest instruction with cache miss pending. For instance, the Next To Complete (NTC) group with cache miss pending is maintained, while any younger groups are completely flushed.

Computer programs comprises of a sequence of instructions that appear to execute in order. This order is sometimes referred to as program order. For example, [Object Y] is younger than [object X] if [object Y] corresponds to an instruction that occurs in program order after an instruction corresponding to [object X]. Accordingly, a younger group can be referred to as group that is dispatched after the NTC group and the subset of the plurality of additional groups experiencing the cache miss. Groups younger than NTC+X can also be referred to as groups that correspond to instructions that occur in program order after the instructions that correspond to NTC+X. This not only throws away work that has been done on this thread but also upon the arrival of data from memory, this thread can only complete one instruction. Flushing everything but the oldest instruction is excessive and negatively affects the performance of the thread with cache miss pending. For instance, while completely flushing the NTC and all younger groups deallocates resources which can then be utilized by other threads, only one instruction/group is available for completion.

Unlike conventional systems which flush NTC+1 in response to a pending cache miss, at least one non-limiting embodiment of the disclosure maintains "X" many instructions/groups for the thread. That is, NTC is determined along with at least one additional group "X". The value "X", however, varies and each "X" can be configured based on which cache miss was detected. Accordingly, resources previously allocated for a thread of a pending cache miss are freed so as to make room for other threads. Once data returns, this thread will have at least "X" instructions to complete and as completing, this thread can begin re-filling the pipe.

Figure 1:
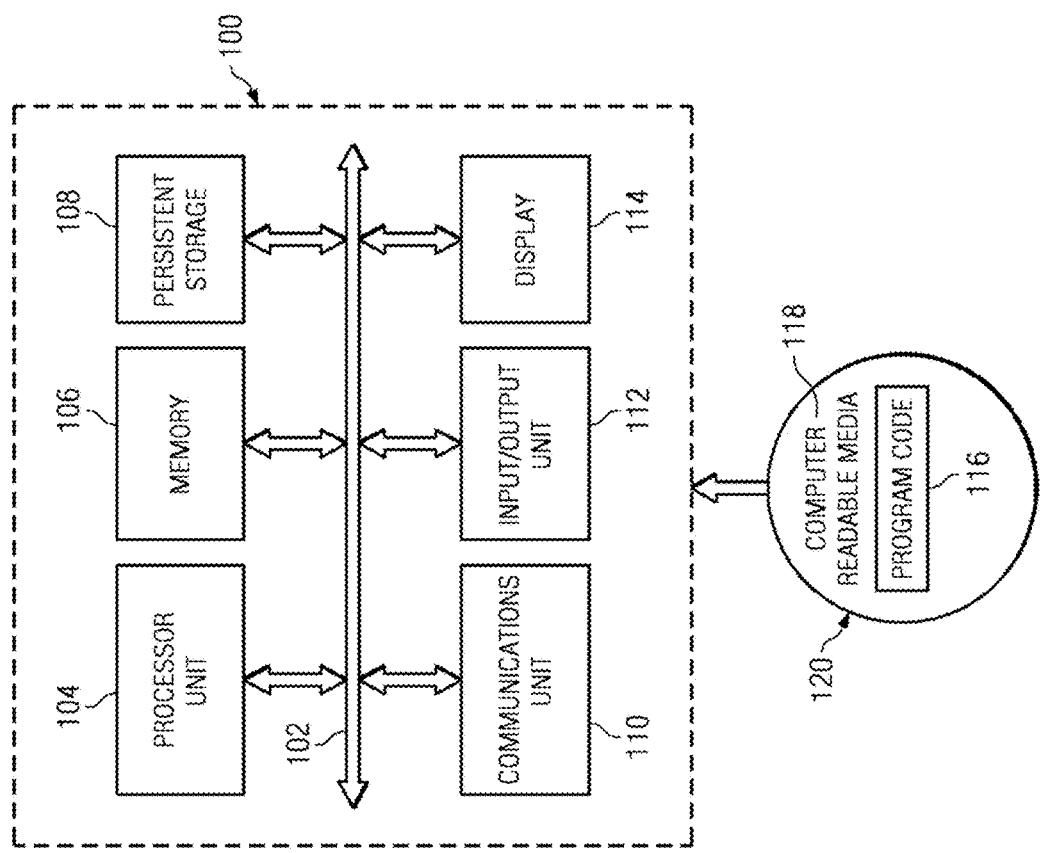
FIG. 1 is a block diagram of a data processing system configured to implement a cache miss balancing system according to non-limiting embodiments.

With reference now to FIG. 1, as will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in any tangible medium of expression having the computer usable program code embodied in the medium.

Any combination of one or more computer usable or computer readable medium(s) may be utilized. The computer usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 depicts a diagram of a data processing system in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
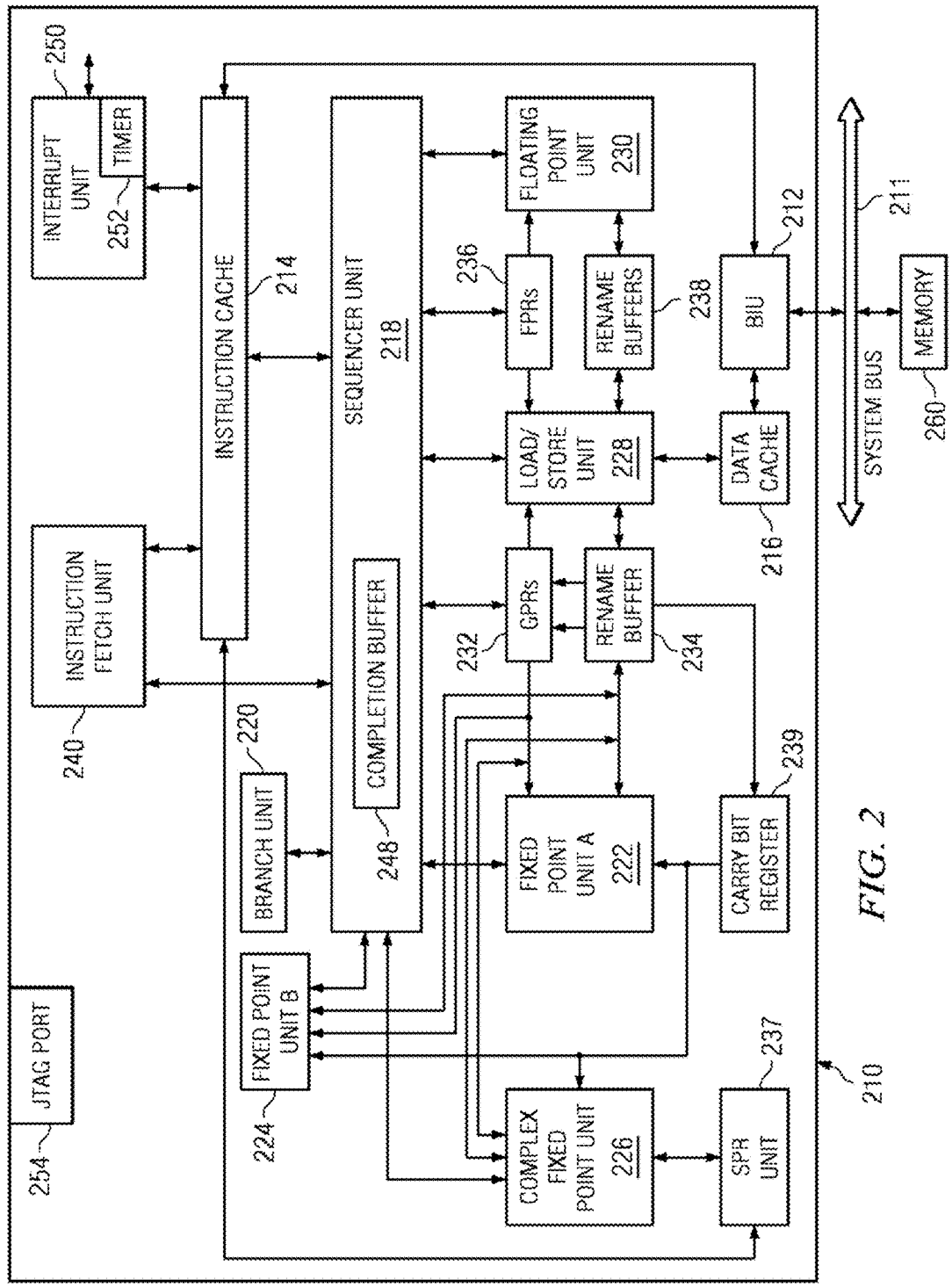
FIG. 2 is a block diagram of a multithreaded processor design showing functional units and registers capable of implement a cache miss balancing system according to a non-limiting embodiment.

FIG. 2 is a block diagram of a multithreaded processor design showing functional units and registers for implementing the illustrative embodiments. Processor 210 is an example of processor unit 104 in FIG. 1. In at least one embodiment, processor 210 is a simultaneous multithread (SMT) process 210. The SMT processor 210 includes one or more circuits to perform cache miss thread balance according to a non-limiting embodiment. For example, a first circuit can detect a cache miss including a stalled and/or resource-consuming target thread. A second circuit can determine a level at which the cache miss occurred. A third circuit can determine a Next To Complete (NTC) group in the thread and dynamically set the least one additional group (X) in the thread based on the detected cache miss. A fourth circuit can flush the stalled and/or resource-consuming target thread included in the cache miss based on the NTC group and the at least one additional group (X). Cache miss thread balancing according to various non-limiting embodiment is discussed in greater detail below.

In an exemplary embodiment, processor 210 is a single integrated circuit superscalar microprocessor. Accordingly, as discussed further herein below, processor 210 includes various units, registers, buffers, memories, and other sections, all of which are formed by integrated circuitry. In addition, in an exemplary embodiment, processor 210 operates according to reduced instruction set computer ("RISC") techniques. As shown in FIG. 2, system bus 211 connects to bus interface unit ("BIU") 212 of processor 210. BIU 212 controls the transfer of information between processor 210 and system bus 211.

BIU 212 connects to an instruction cache 214 and to data cache 216 of processor 210. The instruction and data caches 214 and 216 may, in general, be implemented as a cache hierarchy of multiple levels: L1, L2, L3, L4, . . . etc. Instruction cache 214 outputs instructions to sequencer unit 218. In response to such instructions from instruction cache 214, sequencer unit 218 selectively outputs instructions to other execution circuitry of processor 210. A translation lookaside buffer (TLB) is a table in the processor's memory that contains information about the pages in memory the processor accessed recently. The TLB may be used to translate virtual addresses—derived from the address generation mechanisms implicit in the user-level program code, as generated by sequencer unit 218 and load/store unit 228—into real or physical addresses that map into the actual memory address space allocated for the given application program.

In addition to sequencer unit 218, in an exemplary embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. In addition, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238. In response to a load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 causes instruction fetch unit 240 to fetch the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211. Embedded within (but not shown) sequencer unit 218 is an instruction decode unit and an instruction dispatch unit. The instruction decode unit decodes instructions and passes decoded instructions to the instruction dispatch unit. The instruction dispatch unit selectively groups decoded instructions from instruction decode unit for each thread and outputs a group of instructions for each thread.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

Information stored at a selected one of fixed-point rename buffers 234 is associated with a storage location (e.g. one of GPRs 232 or carry bit (CA) register 239) as specified by the instruction for which the selected rename buffer is allocated. Information stored at a selected one of fixed-point rename buffers 234 is copied to its associated one of GPRs 232 (or CA register 239) in response to signals from sequencer unit 218. Sequencer unit 218 directs such copying of information stored at a selected one of fixed-point rename buffers 234 in response to "completing" the instruction that generated the information. Such copying is called "writeback."

Upon storing information at a selected one of floating-point rename buffers 238, such information is associated with one of FPRs 236. Information stored at a selected one of floating-point rename buffers 238 is copied to its associated one of FPRs 236 in response to signals from sequencer unit 218. Sequencer unit 218 directs such copying of information stored at a selected one of floating-point rename buffers 238 in response to "completing" the instruction that generated the information.

Within sequencer unit 218, completion buffer 248 tracks the completion of the multiple instructions, which are being executed within the execution units. Upon an indication that an instruction or a group of instructions have been completed successfully, in an application specified sequential order, completion buffer 248 may be utilized to initiate the transfer of the results of those completed instructions to the associated general-purpose registers. Completion buffer 248 comprises a global completion table (GCT) which includes entry fields that keep track of valid (live) instructions within the processor 210.

Additionally, processor 210 includes interrupt unit 250. Interrupt unit 250 connects to instruction cache 214. Additionally, although not shown in FIG. 2, interrupt unit 250 connects to other functional units within processor 210, including sequencer unit 218. Interrupt unit 250 may receive signals from other functional units and initiate an action, such as starting an error handling or trap process. In these examples, interrupt unit 250 generates interrupts and exceptions that may occur during execution of a program. Interrupt unit 250 includes timer 252.

Additionally, processor 210 includes JTAG port 254, which connects to an external service element, which is not shown. Latches comprise every element of processor 210. JTAG port 254 connects to all the latches that comprise the elements of processor 210.

Figure 3:
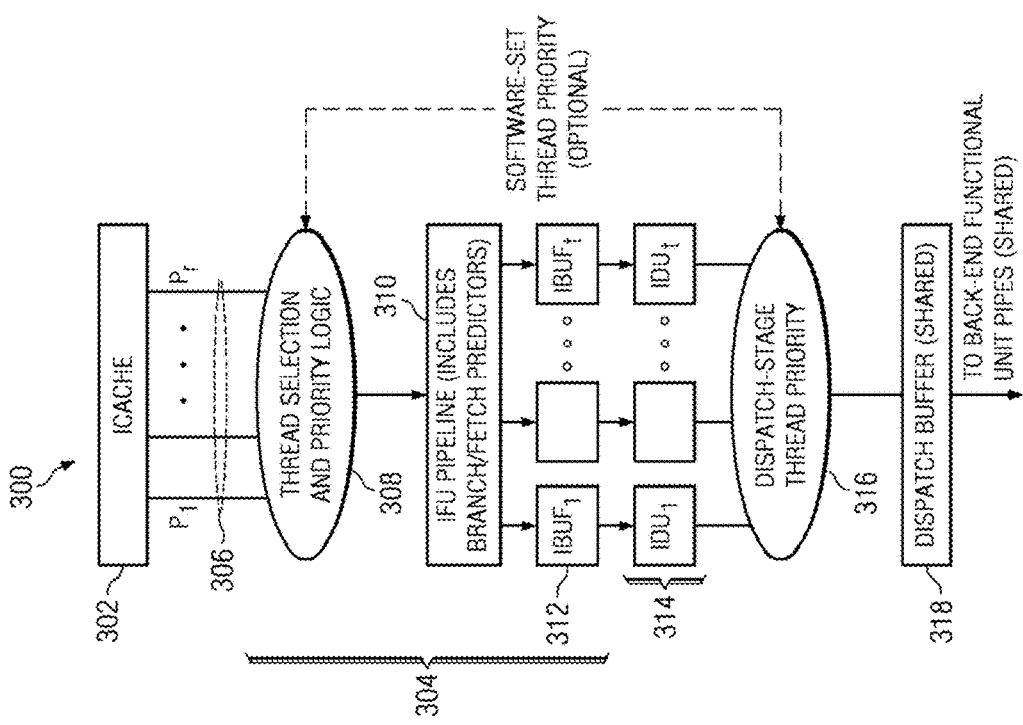
FIG. 3 is a block diagram of exemplary processor pipeline to control thread priority according to a non-limiting embodiment.

FIG. 3 is a block diagram of exemplary processor pipeline for controlling thread priority with which the illustrative embodiments may be implemented. In particular, FIG. 3 depicts the front-end of a processor pipeline implemented by a single superscalar simultaneous multithread (SMT) microprocessor core (CPU), such as ones available in IBM Corporation's p-series server systems (POWER5™ based systems and beyond), for example. An example of the superscalar SMT processor is processor 210 in FIG. 2.

A processor includes a number of stages in the processor pipeline. In a typical first stage, referred to as an instruction fetch stage, the processor fetches an instruction from memory or associative memory structure, each stage including one or more pipelines. Then, in a decode stage, the processor decodes the instruction into different control bits, which in general designate a type of functional unit for performing the operation specified by the instruction, source operands for the operation, and destinations for results of operations. In a dispatch stage, the processor dispatches the decoded instruction per the control bits to a unit having an execution stage, or possibly to an intervening reservation station or issue queue, which ultimately issues the instruction to an associated execution stage (also "execution unit"). The execution stage processes the operation as specified by the instruction. Executing an operation specified by an instruction includes accepting one or more operands and producing one or more results. A completion stage deals with program order issues that arise from concurrent execution, wherein multiple, concurrently executed instructions may deposit results in a single register. The completion stage also handles recovery issues arising from instructions subsequent to an interrupted instruction depositing results in their destination registers. This stage is also sometimes called a writeback stage since it is at this time that results of the execution of instructions are written back to designated locations such as registers.

In this illustrative example, processor front-end pipeline 300 includes shared instruction cache (ICache) 302 which holds instructions for multiple programs (threads) to be executed. The processor retrieves instructions from system memory, such as memory 106 in FIG. 1, and stores the instructions in instruction cache 302.

During the fetch stage, instruction fetch unit (IFU) 304 fetches instructions as needed from instruction cache 302 via read ICache read ports (P1 to Pr 306). Instruction fetch unit 304 requests instructions from instruction cache 302 according to an instruction address, and may, in general, request instructions from instruction cache 302 for a plurality of threads at the same time. Instruction fetch unit 304 comprises thread selection and priority logic 308 which assigns a fetch-stage priority level to each thread executed by the processor. Thread selection and priority logic 308 may be embedded within instruction fetch unit 240 in FIG. 2. A thread assigned a high priority may receive more decode units, more dispatch cycles, and other processor resources, while a lower priority thread is granted fewer resources. As threads are assigned priority levels, the instruction fetch unit pipeline 310 provides the threads (in priority order) to instruction buffers (IBUFs) 312 for supported threads.

During the decode and dispatch stage, instruction decode and dispatch units (IDUs) 314 decode instructions for concurrent threads. Instruction decode and dispatch units 314 also have an associated thread selection and priority logic 316 which controls the dispatch priority levels assigned to each thread executed by the processor. Thread selection and priority logic 316 may be embedded within sequencer unit 218 in FIG. 2, or thread selection and priority logic 316 may be a standalone unit connected to sequencer unit 218. Instruction decode and dispatch units 314 pass the prioritized instructions to shared dispatch buffer 318. Instruction decode and dispatch units 314 then dispatch instructions as appropriate from dispatch buffer 318 to the back-end execution units (not shown) in the system depicted in FIG. 3.

The architecture depicted in FIG. 3 is provided solely for the purpose of illustrating and explaining the embodiments of the present invention, and is not meant to imply any architectural limitations. Those skilled in the art will recognize that many variations are possible.

Figure 4:
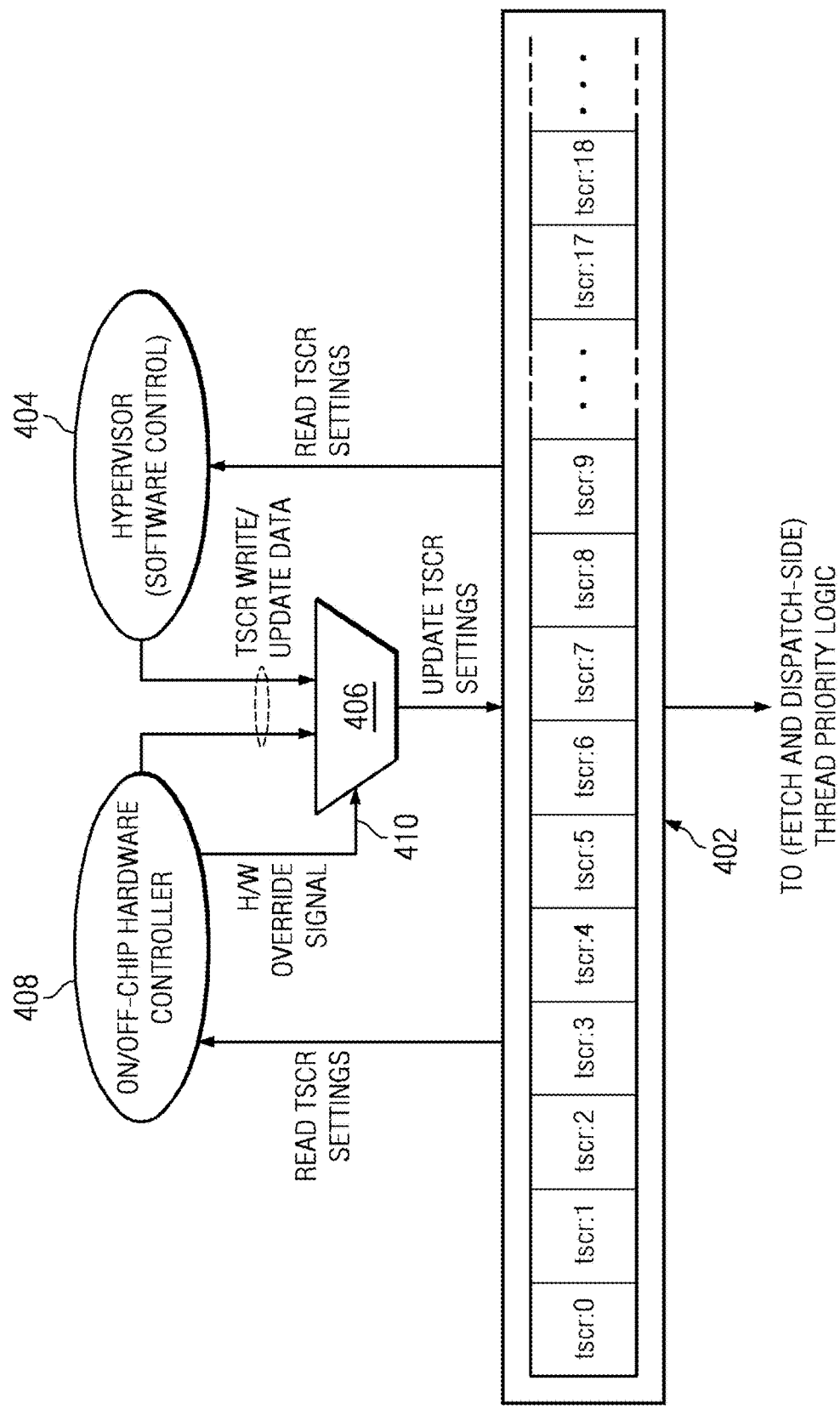
FIG. 4 is a block diagram of exemplary components for reading and writing to thread switch control registers (TSCRs) in accordance with non-limiting embodiments.

FIG. 4 is a block diagram of exemplary components for reading and writing to thread switch control registers, such as thread switch control register (TSCR) 402, in accordance with the illustrative embodiments. Thread switch control register 402 comprises a programmable hardware register. Each executing thread in an SMT data processing system has its own thread switch control register. Thread switch control register 402 comprises a plurality of bits (TSCR[0], TSCR[1], etc.) which are associated with one of a plurality of thread priority control settings.

The multithreaded processor uses the thread priority control setting associated with a bit in thread switch control register 402 to control instruction flow and handle competition among executing threads for securing various processing resources. In particular, thread selection and priority logic 308 and 316 in the processor pipeline in FIG. 3 use priority information obtained from the thread switch control registers to determine and set the priority levels of the executing threads. The exact number of bits constituting thread switch control register 402 is flexible, and the positional semantics of what each bit signifies is also dependent on the particular implementation.

In a typical SMT data processing system, a software controller such as hypervisor 404 is the only component which controls and updates the bit settings in the thread switch control registers. Hypervisor 404 provides default thread priority bit settings in thread switch control register 402 and may also change the enablement of the bit settings. Hypervisor 404 sets the thread priority bits in such a manner as to maximize throughput performance of the SMT processor, while maintaining fairness across executing threads. The embodiments of the present invention enable mechanisms that allow shared control of thread switch control registers (TSCRs) bit setting capability via hypervisor 404 or a hardware controller 408 that may reside on-chip or off-chip. Hypervisor 404 reads bit settings present in thread switch control register 402 and provides updated bit settings to multiplexer 406. Multiplexer 406 may then update the bit settings in thread switch control register 402 according to the settings provided by hypervisor 404.

On/off-chip hardware controller 408 is provided in the illustrative embodiments to dynamically change the enablement of bits in thread switch control register 402, and thereby override the default thread priority bit settings set by hypervisor 404. Hardware controller 408 reads bit settings in thread switch control register 402 and provides updated bit settings to multiplexer 406. Multiplexer 406 then updates the bit settings in thread switch control register 402 according to the settings provided by hardware controller 408. Hardware override signal 410 sourced by the hardware controller 408 allows multiplexer 406 to select the update commands from hardware controller 408 over the default commands provided by the hypervisor 404. Hardware controller 408 is ultimately also under system software control (link not shown), and usually, final override control is exercised by (hierarchical) system software represented through entities like the hypervisor and operating system. Hardware controller 408, in response to system-specified power targets for a given processor chip, may recognize the need to alter the default/prior TSCR settings in order to adjust the power level within each processor core. For example, hardware controller 408 may recognize the need to invoke a pre-specified "low power" mode for a given (set of) processor core(s). This recognition may lead hardware controller 408 to set hardware override signal 410 in order to provide multiplexer 406 the ability to select the updated TSCR setting commands from the hardware controller 408, instead of from the default source represented by the hypervisor 404.

In contrast with hypervisor 404, hardware controller 408 dynamically controls the thread priority settings in thread switch control register 402 to control the power consumption of the system. For instance, as already stated, if a lower power mode is desired, hardware controller 408 updates the priority bit settings appropriately to result in low power consumption. The stipulated low power mode level (e.g. low, medium or high) is either inferred autonomously by hardware controller 408 (in response to currently monitored power levels and their relation to power targets specified by system-level directives), or is directly communicated by system-level control. Whether or not to invoke the thread priority control knob and what the new TSCR settings should be to effect desired power reduction, are decisions that are part of the logic incorporated in the controller (implemented in hardware or through programmed software/firmware running on the controller). By changing the priority bit settings to increase power-performance efficiency, the throughput performance of the multithreaded processor may decrease and the fairness across the executing threads may decrease. However, changing the priority bit settings to achieve a desired power consumption mode may, in many cases, result in both increased power efficiency and increased net throughput performance because disabling a certain category of flushes may allow higher performance threads to capture the majority of resources. Consequently, changing the priority bit settings to achieve a desired power consumption mode may enhance throughput performance at the cost of hurting fairness criteria.

The TSCR bit definitions can be organized in a TSCR table. In at least one embodiment, a 2-bit field <gctdec:2> of thread switch control register 402 in FIG. 4 defines the global completion table (GCT) decode priority control. The global completion table is a hardware entity that includes one or more entry fields that keeps track of valid (live) instructions within the microprocessor from decode/dispatch through completion. Physically, the global completion table may be implemented as part of the functionality of completion buffer 248 indicated in FIG. 2. The global completion table decode priority control specifies the threshold levels for changing the priority level of a thread based on how many global completion table entries are utilized by the thread. When all threads executing have the same software-set priority level, thread selection and priority logic 308 and 316 in the processor pipeline in FIG. 3 will decrease the priority of a thread if the thread is utilizing more than a specified number of global completion table entries. For instance, if <gctdec:2> in the thread switch control register is set to "10", the priority of the thread will be decreased if the thread is using more than a programmable threshold in terms of the number of entries within the GCT. If <gctdec:2> in the thread switch control register is set to "00", the global completion table decode priority control is disabled, and no action is taken. This 2-bit field <gctdec:2> is also used to trade off power and performance.

A 1-bit field <bf:1> of thread switch control register 402 in FIG. 4 can define the enablement/disablement setting of the cache miss balance flush. A cache miss balance flush is a thread control mechanism which selectively flushes a stalled and/or resource-consuming target thread, also referred to as a pending cache miss, from the system to restore resource usage fairness or balance. The cache miss balance flush operation performs a flush on the NTC+X, where "X" is configurable and is different based on the cache hierarchy level (L1, L2, L3, L4, . . . Ln), at which the cache miss occurred. Cache miss balance flushes may be enabled or disabled using a bit field within the thread switch control register.

For instance, A 2-bit field <gctbf-a:2> of thread switch control register 402 in FIG. 4 can define the global completion table cache miss balance flush threshold control for the L3 cache and TLB misses. An L3 cache or TLB miss occurs when the L3 cache or TLB does not to contain data with a desired tag. If a thread stalls at dispatch due to an L3 or TLB miss, the thread may be cache miss balance flushed. For example, if the bit pair <gctbf-a:2> in the thread switch control register is set to "01", a cache miss balance flush will be performed on the thread if the thread is utilizing at least a programmable minimum number of global completion table entries. If bit pair <gctbf-a:2> is set to "10", or "11" the microprocessor performs a cache miss balance flush on the thread if the thread is utilizing other different programmable thresholds in terms of number of global completion table entries. Setting the <gctbf-a:2> field in the thread switch control register to "00" disables the cache miss balance flush threshold control.

The 2-bit field <gctbf-b:2> 510 of thread switch control register 402 in FIG. 4 defines the global completion table cache miss balance flush threshold control with no L3 cache and TLB misses. A thread with no L3 cache or TLB misses may be cache miss balance flushed based on bit pair <gctbf-b:2>. As before, depending on programmable, pre-defined threshold values in the number of utilized GCT entries, a given thread may be cache miss balance flushed. Setting the <gctbf-b:2> field to "00" disables the cache miss balance flush threshold control.

The 2-bit field <bfmc:2> 512 of thread switch control register 402 in FIG. 4 defines the global completion table cache miss balance flush counter threshold control. If a thread stalls at dispatch and has an L3 cache or TLB miss outstanding, the thread is only considered for a cache miss balance flush if the cache miss balance flush miss cycle counter is less than a specific number of cycles. The 2-bit encoding in <bfmc:2> (e.g. "01", "10" or "11") specifies programmable thresholds in the cache miss balance flush cycle counter value to trigger this class of cache miss balance flushes. Setting the <bfmc:2> field to one of the encoding patterns (e.g. "00") disables the cache miss balance flush counter threshold control mechanism.

Figure 5A:
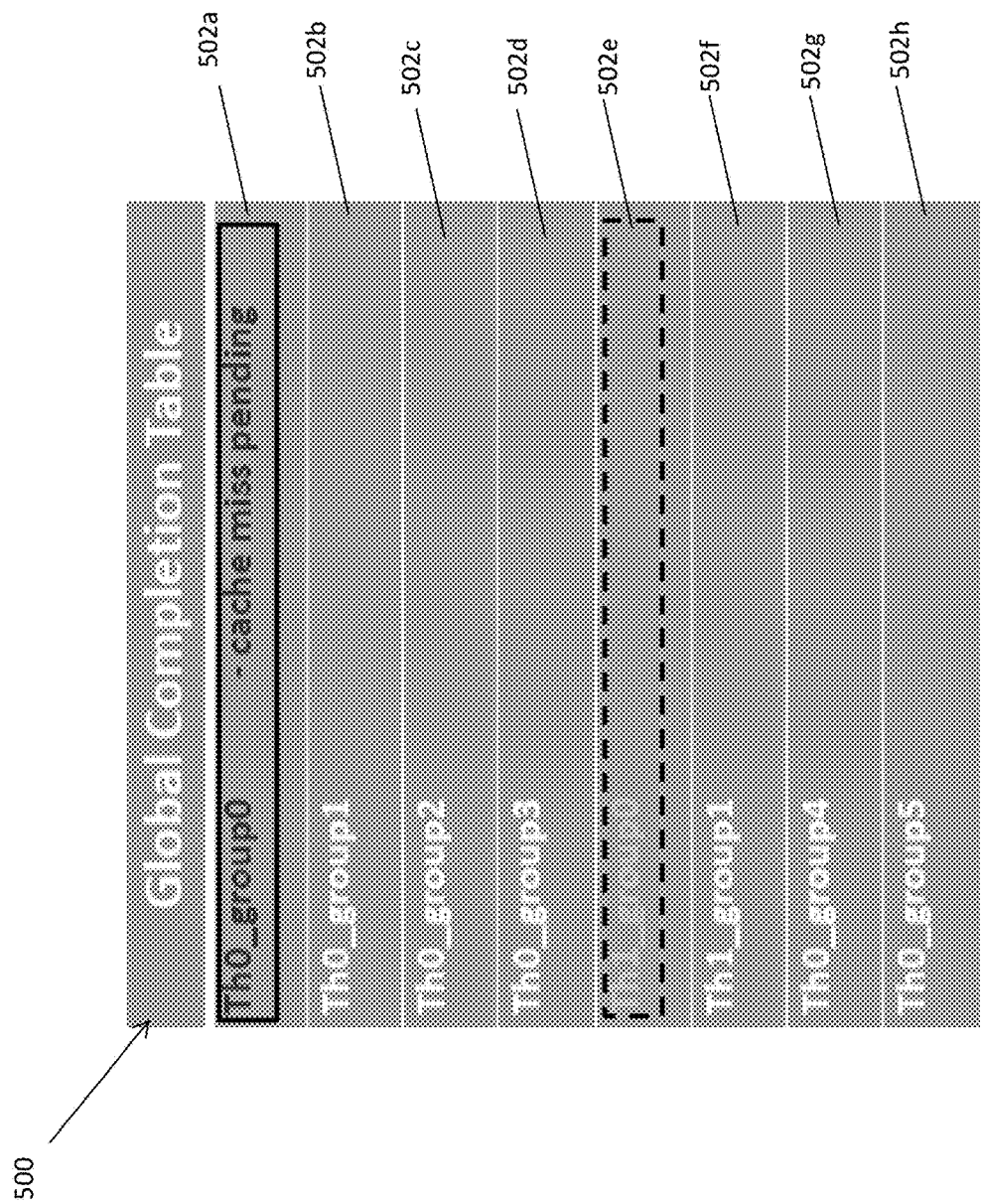
FIGS. 5A, 5B and 5C illustrate a global completion table undergoing a cache miss balancing operation according to a non-limiting embodiment.
Figure 5B:
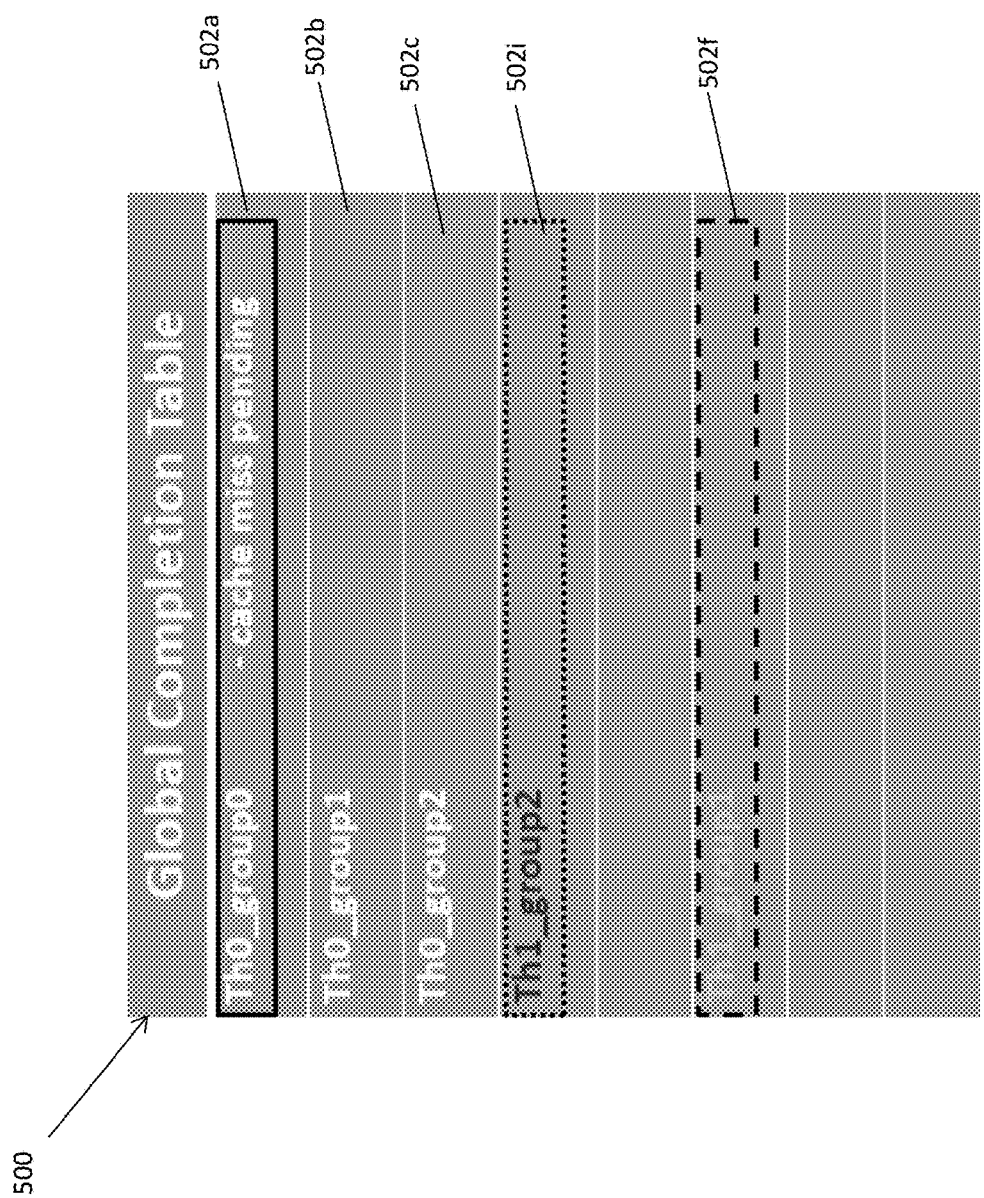
Figure 5C:
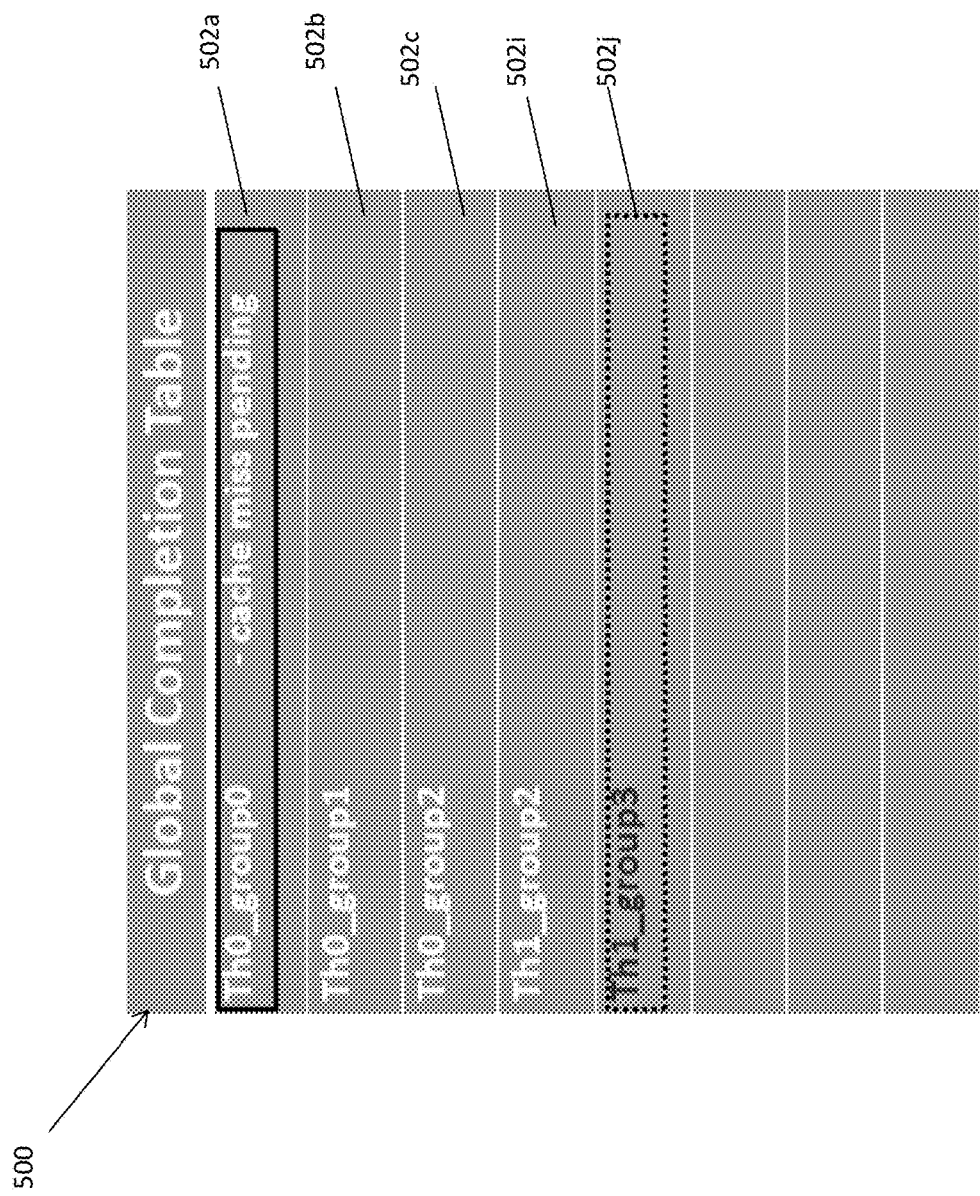

Turning to FIGS. 5A-5C, a global completion table 500 undergoing a cache miss balancing operation is illustrated according to a non-limiting embodiment. Referring to FIG. 5A, the global completion table 500 is illustrated having eight entries 502a-502h, for example, during a first cycle (Cycle 0). The eight entries include six first thread entries 502a (Th0_group0), 502b (Th0_group1), 502c (Th0_group2,), 502d (Th0_group3), 502g (Th0_group4,) and 502h (Th0_group5), and two second thread entries 502e (Th1_group0), and 502f (Th1_group 1). During a first cycle (e.g., cycle 0), The next to complete first thread entry 502a (e.g., Th0_group0) is experiencing a pending cache miss as indicated by the solid block outline, while one of the second thread entries 502e (e.g., Th1_group0) completes as indicated by the dashed block outline.

Turning to FIG. 5B, the global completion table 500 is illustrated during a second cycle (e.g., cycle 1). The resources for 502e (Th1_Group0) have been released due to the completion in cycle 0. During this second cycle, the first thread entry 502a (e.g., Th0_group0) still experiences a pending cache miss. However, a NTC+X flush is performed, where "X" is set to 2, for example. Accordingly, entries 502d (Th0_Group3), 502g (Th0_group4) and 502h (Th0_Group5) are flushed and therefore not shown in the table 500 during the second cycle. Accordingly, resources previously allocated to 502d (Th0_group3), 502g (Th0_group4) and 502h (Th0_group5) are now open to host newly dispatched entries.

Along with the NTC+X flush, another second thread entry completes, e.g., 502f (Th1_group1), and a new second thread entry 502i (e.g., Th1_group2) is dispatched as indicated by the dotted block outline. Dispatch of a new first thread entry (Th0_groupN), however, is blocked because the first thread entry 502a (e.g., Th0_group0) still experiences a pending cache miss.

Turning to FIG. 5C, the global completion table 500 is illustrated during a third cycle (e.g., cycle 2). During this next cycle, the first thread entry 502a (e.g., Th0_group0) still experiences a pending cache miss. Therefore, dispatch of a new first thread (Th0_groupN) is again blocked. However, another new second thread 502j (e.g., Th1_group3) is dispatched as indicated by the dotted block outline. The resources for 502f (Th1_Group1) have been released due to its completion in cycle 1. Accordingly, the second thread (i.e., Th1) can continue making progress despite the pending cache miss experienced by the first thread (i.e., Th0).

Figure 6A:
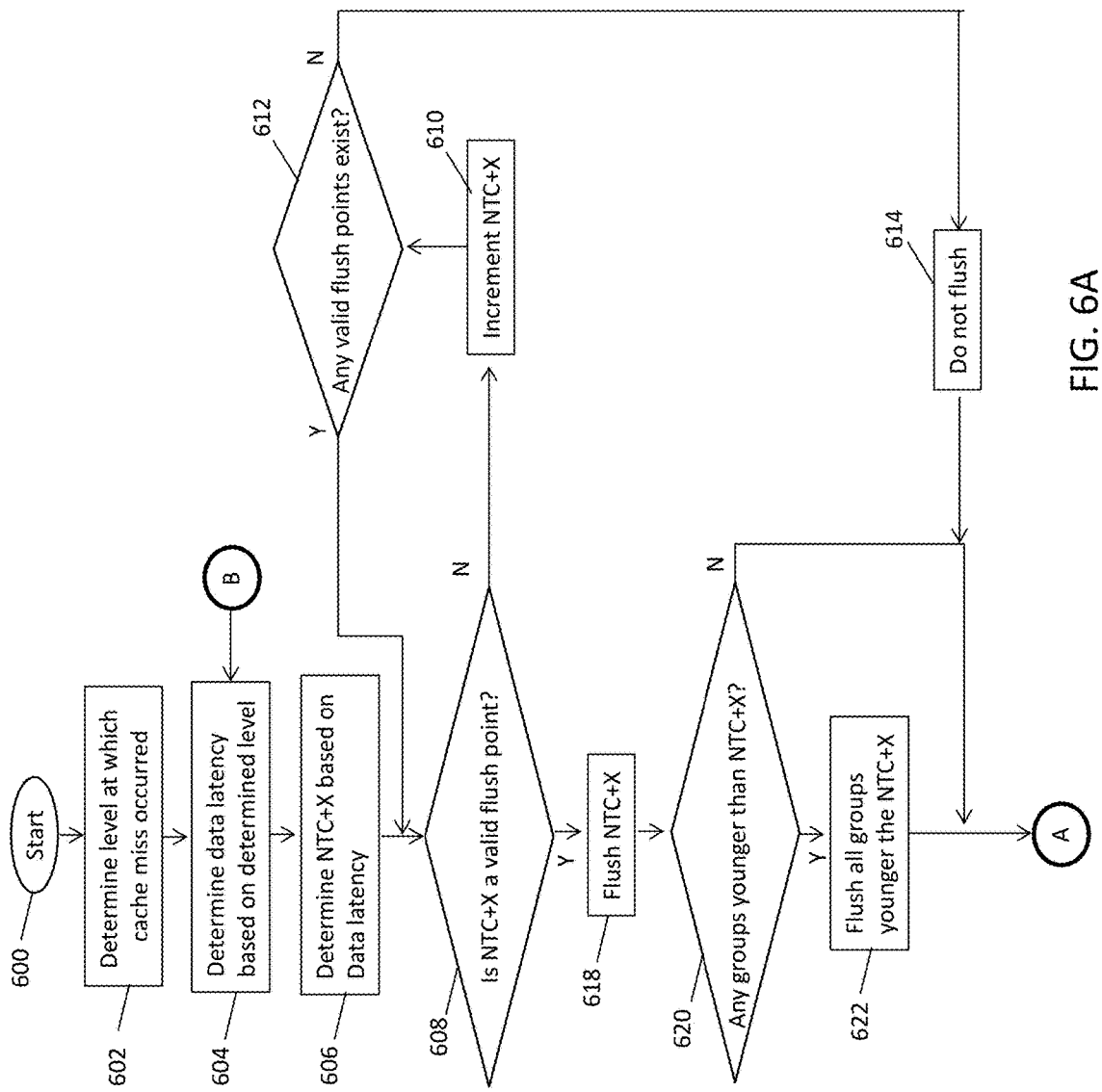
FIGS. 6A and 6B illustrate a flow diagram of a method to perform cache miss thread balancing according to a non-limiting embodiment.
Figure 6B:
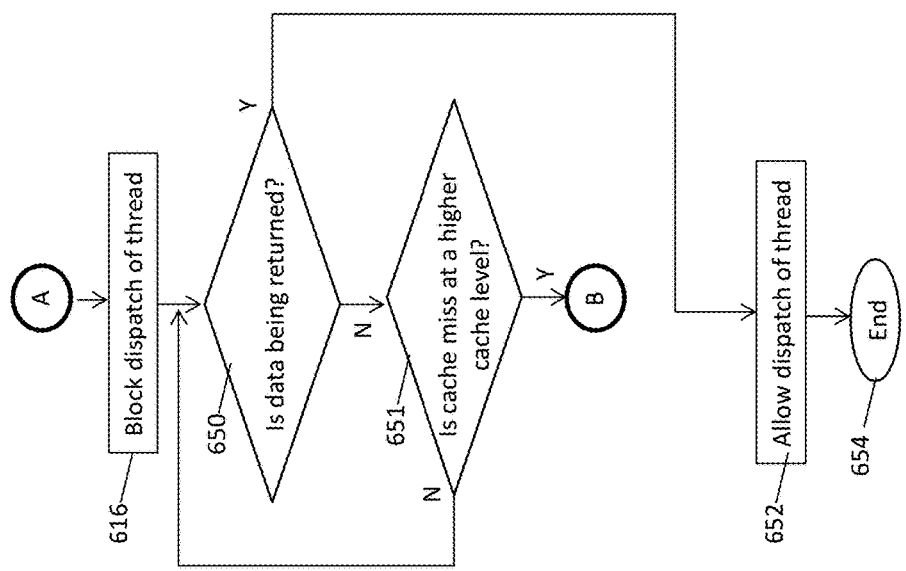

Referring now to FIGS. 6A and 6B, a flow diagram illustrates a method of performing cache miss thread balancing according to a non-limiting embodiment. The method starts at operation 600, and at operation 602 a cache miss is detected and the level at which the cache miss occurred is determined. At operation 604, a data latency is determined based on the level at which the cache miss occurred. At operation 606, NTC+X is determined based on the data latency. In at least one embodiment, a different latency will exist based on the level of the cache miss. For example, the latency at a level 1 (L1) cache miss is less than a latency of a level 2 (L2) cache miss, a latency of a L2 cache miss is less than the latency at a level 3 (L3) cache miss, and the latency at a L3 cache miss is less than the latency at a level 4 (L4) cache miss. Accordingly, "X" of NTC+X varies or is configurable based on the level of the cache miss. For example, "X" corresponding to a L2 cache miss is greater than "X" corresponding to a L3 cache miss, while "X" corresponding to a L3 cache miss is greater than "X" corresponding to a L4 cache miss.

Turning to operation 608, a determination is made as to whether the currently determined NTC+X is a valid flush point. For instance, a flush operation is not performed in the middle of an instruction. Accordingly, when the currently determined NTC+X is not a valid flush point, a search of the younger entries is performed to find a valid flush point. The NTC+X is incremented at operation 610. At operation 612, a determination is made as to whether any valid flush points exist after incrementing NTC+X. For example, if the currently determined NTC+X does not exist at an instruction boundary, the current flush point is incremented until a valid NTC+X is found. When no valid flush points exist at operation 612, a flush operation is not performed at operation 614, and the method proceeds to operation 616 where dispatch of a thread (e.g., the next thread) is blocked. When, however, one or more valid flush points exist at operation 612, the method returns to operation 608 to confirm that the incremented NTC+X is a valid flush point.

Referring back to operation 608, when a NTC+X is a valid flush point, the method proceeds to operation 618 and the NTC+X is flushed. NTC+X flushing prevents a thread with a pending cache miss from saturating and over-consuming computing resources. In at least one embodiment, after flushing the NTC+X, data dispatch to the corresponding thread is blocked until (i) a load store unit indicates that the pending cache miss no longer exists, (ii) a group completion from the corresponding thread occurs, or (iii) the corresponding thread is restarted. At operation 620, a determination is made as to whether any groups younger than the flushed NTC+X exist. When no younger groups exist, the method ends at operation 616. In at least one embodiment, when data returns, a thread will have "X" groups ready to complete.

When, however, one or more younger groups exist, all the groups younger than the flushed NTC+X are also flushed at operation 622, and the method blocks dispatch of a thread (e.g., the next thread) at operation 616.

Turning to operation 650, a determination is made as to whether data is being returned while the thread dispatch is blocked. When data is returned, dispatch of the thread (e.g., next thread) is allowed at operation 652, and the method ends at operation 654. When, however, data is not returned at operation 650, the method proceeds to operation 651 to determine whether the cache miss is at a higher cache level. When it is determined that the cache miss is not at a higher cache level, the method returns to operation 650 and continues analyzing whether data is returned. When, however, the cache miss is determined to be at a higher level, the method returns to operation 604 and determines the data latency based on the cache hierarchy level (e.g., the next highest cache level at which the cache miss is detected). Because a new data latency may be determined at operation 604 due to the higher cache level, NTC+X may be revised because the additional groups (X) associated with the NTC group are based on the data latency which varies according to a cache hierarchy level at which the pending cache miss exists. The method described above may then be repeated using the updated NTC+X.

Figure 7:
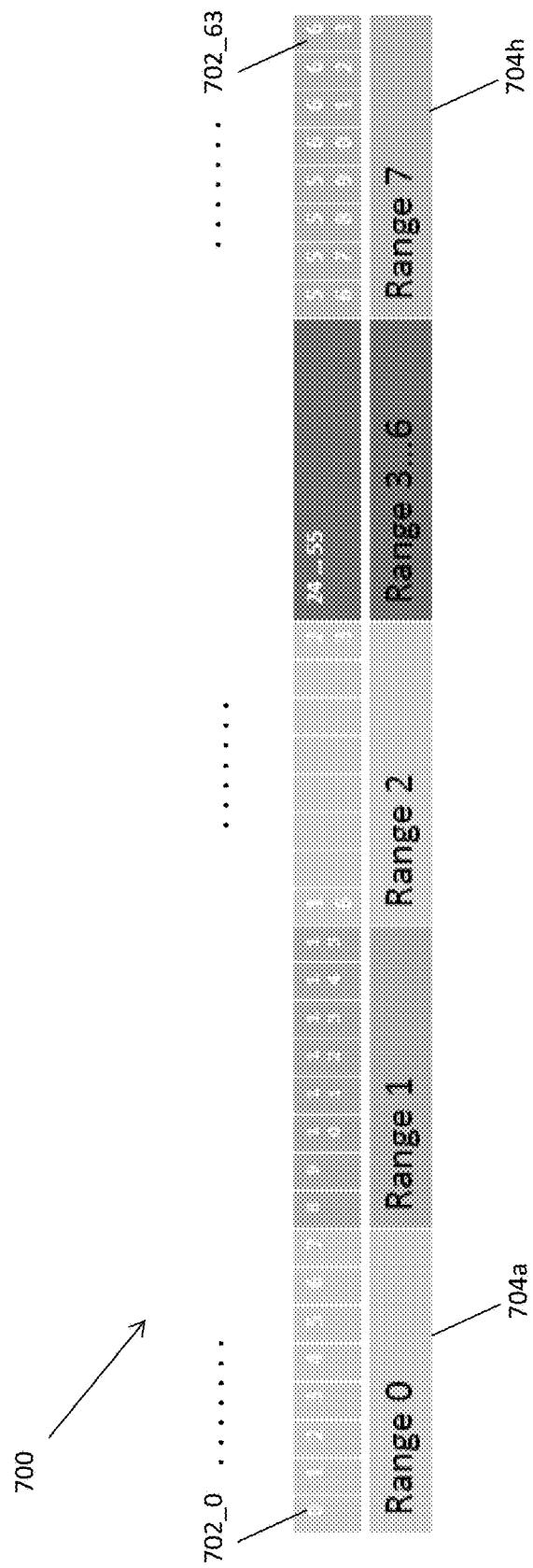
FIG. 7 illustrates a search vector that includes a valid flush point (VFP) sub-vector and a search range (SR) sub-vector to confirm whether a determined NTC+X is a valid flush point according to a non-limiting embodiment.

In at least one embodiment, the cache miss balance operation can perform a valid flush point analysis before performing the cache miss balance flush. Referring to FIG. 7, a search vector 700 is generated which includes a valid flush point (VFP) sub-vector and a search range (SR) sub-vector. The search vector 700 includes 64 tags 702_0-702_63. The search vector 700 is divided into eight individual ranges 704a-704h, for example. Accordingly, each individual range includes eight tags. The eight ranges can be identified using a most significant bit strategy, i.e., the 3 most significant bits.

An analysis can then be performed to determine whether a flush point exists in any of the ranges 704a-704h. In at least one embodiment, the first range to be selected as a valid flush point is based on a flush request tag. That is, the range at which the flush request tag resides indicates the first range to be flushed according to the cache miss balance flush operation described herein. In at least one embodiment, subsequent ranges can be selected for flushing by shifting (i.e., incrementing) the starting search range. For example, a second range for flushing is selected by right-rotate shifting the search_start_range by 1, a third range for flushing is selected by right-rotate shifting the search_start_range by 2, etc. In at least one embodiment, the analysis identifies the oldest valid flush group, and selects the identified oldest valid flush group to perform the cache miss balance flush.

A valid flush point vector can be used to search for a valid NTC+X flush point. The valid flush point vector contains a valid flush bit for every group number to be searched. The valid flush bit is set to a one ('1') to indicate that the corresponding group number represents a valid flush point. A find first one operation is performed on the valid flush bit vector starting at the group number corresponding to the latency-based NTC+X flush point. If a one location is found by the find first one operation then the one location corresponds to the correct valid NTC+X flush point. If the find first one operation does not find a '1', then no valid flush point is found. Circuits and algorithms to perform find first one operations are well known and the details of their implementation are therefore omitted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of balancing a cache miss thread, the method comprising:
    detecting a cache miss of the cache miss thread;
    determining a first cache hierarchy level at which the detected cache miss occurred;
    determining a Next To Complete (NTC) group in the cache miss thread and a plurality of additional groups (X) in the cache miss thread, the plurality of additional groups (X) being dynamically configured based on the detected cache miss; and
    determining whether any groups in the cache miss thread are younger than the determined NTC group and the plurality of additional groups (X), and flushing all the determined younger groups from the cache miss thread.

2. The method of claim 1, wherein the plurality of additional groups (X) is based on data latency.

3. The method of claim 2, wherein the data latency is based on the first cache hierarchy level at which the detected cache miss occurred.

4. The method of claim 1, further comprising:
    identifying a second cache hierarchy level that is higher than the first cache hierarchy level;
    determining that the detected cache miss is from the second cache hierarchy level;
    determining the NTC group and a subset of the plurality of additional groups based on the second cache hierarchy level; and
    flushing at least one additional flushed group in the cache miss thread that is younger than a NTC group and the subset of the plurality of additional groups.

5. The method of claim 1, wherein the flush occurs after detecting a valid flush point.

6. The method of claim 5, wherein prior to determining the younger groups, detecting the valid flush point comprises:
    determining whether the NTC group and the plurality of additional groups (X) constitute a valid flush point; and
    searching for larger values that define the plurality of additional groups (X) in response to determining the NTC group and the plurality of additional groups (X) define an invalid flush point.

7. A computer program product to perform cache miss thread balancing, the computer program product comprising a non-transitory computer readable storage medium having program instructions embodied therewith, the program instructions executable by an electronic computer processor to control a database processing system to perform: detecting a cache miss in the cache miss thread; determining a cache hierarchy level at which the detected cache miss occurred; determining a Next To Complete (NTC) group in the cache miss thread and a plurality additional groups (X) in the cache miss thread, the plurality of additional groups (X) being dynamically configured based on the detected cache miss; and determining whether any groups in the thread are younger than the determined NTC group and the plurality of additional groups (X), and flushing all the determined younger groups from the cache miss thread.

8. The computer program product of claim 7, wherein the plurality of additional groups (X) is based on data latency.

9. The computer program product of claim 8, wherein the data latency is based on the cache hierarchy level at which the detected cache miss occurred.

10. The computer program product of claim 7, further comprising:
    identifying a second cache hierarchy level that is higher than the first cache hierarchy level;
    determining that the detected cache miss is from the second cache hierarchy level;
    determining the NTC group and a subset of the plurality of additional groups based on the second cache hierarchy level; and
    flushing at least one additional flushed group in the cache miss thread that is younger than a NTC group and the subset of the plurality of additional groups.

11. The computer program product of claim 10, wherein prior to determining the younger groups, detecting the valid flush point comprises:
    determining whether the NTC group and the plurality of additional groups (X) constitute a valid flush point; and
    searching for larger values that define the plurality of additional groups (X) in response to determining the NTC group and the plurality of additional groups (X) define an invalid flush point.

12. The computer program product of claim 11, further comprising:
    incrementing the NTC group and the plurality of additional groups (X) in response to determining the invalid flush point, until a valid flush point is found; and
    flushing all the determined younger groups from the cache miss thread included in the cache miss based on the incremented NTC group and plurality of additional groups (X) in response to detecting that the incremented NTC group and plurality of additional groups (X) is a valid flush point.

13. A simultaneous multithread (SMT) processor having a shared dispatch pipeline comprising:
    a first circuit that detects a cache miss thread;
    a second circuit that determines a first cache hierarchy level at which the detected cache miss occurred;
    a third circuit that determines a Next To Complete (NTC) group in the thread and a plurality of additional groups (X) in the thread, the plurality of additional groups (X) being dynamically configured based on the detected cache miss; and
    a fourth circuit that determines whether any groups in the thread are younger than the determined NTC group and the plurality of additional groups (X), and flushes all the determined younger groups from the cache miss thread.

14. The SMT processor of claim 13, where a size of the plurality of additional groups (X) is based on data latency.

15. The SMT processor of claim 14, wherein the data latency is based on the first cache hierarchy level at which the detected cache miss occurred.

16. The SMT processor of claim 15, wherein the second circuit identifies a second cache hierarchy level that is higher than the first cache hierarchy level, and wherein the SMT processor further comprises:
- a fifth circuit that determines that the detected cache miss is from the second cache hierarchy level;
- a sixth circuit that identifies the NTC group and a subset of the plurality of additional groups based on the second cache hierarchy level,
- wherein the fourth circuit flushes at least one additional flushed group in the cache miss thread that is younger than the NTC group and the subset of the plurality of additional groups, and
- wherein the second cache hierarchy level is based on a determination that the NTC group has been waiting for a longer time indicating that the data will be returned from the second cache hierarchy level.

17. The SMT processor of claim 13 wherein the fourth circuit determines whether the NTC group and the plurality of additional groups (X) constitute a valid flush point.

18. The SMT processor of claim 17, wherein based on a validity of the NTC group and the at least one additional group (X), the fourth circuit either flushes the stalled and/or resource-consuming target thread included in the cache miss based on the NTC group and the plurality of additional groups (X) in response to detecting the valid flush point, or blocks the flushing when the NTC group and the plurality of additional groups (X) is an invalid flush point.

19. A method of performing a cache miss thread balance on a global completion table, the method comprising:
- detecting a first group of a first thread experiencing a pending cache miss;
- determining a Next To Complete (NTC) group in the first thread and plurality of additional groups (X) in the first thread;
- flushing, from the global completion table, at least one group of the first thread that is dispatched after the NTC group in the first thread and plurality of additional groups (X) in the first thread so as to provide at least one empty global completion table entry field; and
- storing, in the at least one empty global completion table entry field, a new group of a second thread different from the first thread.

20. The method of claim 19, wherein the new group of the second thread is dispatched while the first group of the first thread experiences the pending cache miss.

21. The method of claim 20, wherein the new group listed in the global completion table completes execution while the first group of the first thread experiences the pending cache miss.

22. The method of claim 21, wherein a new group of the first group is blocked from dispatching while the first group of the first thread experiences the pending cache miss.

23. The method of claim 22, wherein the plurality of additional groups (X) associated with the NTC group is based on data latency that varies according to a cache hierarchy level at which the pending cache miss exists, the data latency defined as an amount of time it takes data to return from the cache hierarchy level.

* * * * *